United States Patent [19]

Suzuki et al.

[11] 4,312,437
[45] Jan. 26, 1982

[54] DEVICE FOR UNLOADING BOTTLE-SHAPED CONTAINERS

[75] Inventors: Sadao Suzuki, Tokyo; Yoshiyuki Ichizawa, Sohka; Nobuichi Seki, Tokyo, all of Japan

[73] Assignee: Yoshino Kogyosho Co., Ltd., Tokyo, Japan

[21] Appl. No.: 102,612

[22] Filed: Dec. 11, 1979

[30] Foreign Application Priority Data

Dec. 28, 1978 [JP] Japan .................. 53-162046

[51] Int. Cl.³ .......................................... B65G 29/00
[52] U.S. Cl. ................................ 198/404; 198/480; 414/224; 414/736; 414/740; 425/397; 425/534
[58] Field of Search .............. 198/480, 404, 612, 613, 198/803, 339; 414/222, 224–225, 729, 736, 744 R, 744 C, 740; 425/397, 403.1, 522, 525, 534

[56] References Cited

U.S. PATENT DOCUMENTS

| 2,207,179 | 7/1940 | Schreiber | 198/404 X |
| 3,235,445 | 2/1966 | Hugentobler | 425/397 X |
| 3,252,588 | 5/1966 | Altembürger | 198/404 X |
| 3,347,967 | 10/1967 | Hopkins et al. | 425/397 X |

Primary Examiner—Robert B. Reeves
Assistant Examiner—Douglas D. Watts
Attorney, Agent, or Firm—Stevens, Davis, Miller & Mosher

[57] ABSTRACT

A device for supplying a piece of preformed synthetic resin to the next process line in an apparatus for producing a bottle-shaped blow-molded container of biaxially oriented polyethylene terephthalate by overturning the piece from neck portion upward position into neck portion downward position, engaging the piece thus overturned to neck portion downward position with orienting jigs held at equidistant central angles at the peripheral edge of a turntable rotating at constant speed in predetermined direction, and supplying the piece held at the jigs around the turntable to a next process line adjacent to the turntable. Thus, the pieces can be continuously rapidly and exactly supplied to the next stage or line.

10 Claims, 4 Drawing Figures

DEVICE FOR UNLOADING BOTTLE-SHAPED CONTAINERS

BACKGROUND OF THE INVENTION

This invention relates to a device for supplying a piece preformed of synthetic resin to the next processing line in an apparatus for producing a bottle-shaped blow-molded container of biaxially oriented synthetic resin.

In molding a bottle-shaped container of synthetic resin such as polyethylene terephthalate resin by means of an injection blow molding process, there is adopted an orientation blow molding process which has the steps of first molding a cylindrical piece with a bottom as preformed piece by an injection molding machine, heating the piece to predetermined temperature, charging it into a mold, and biaxially orientation blow molding the piece to thus produce a final product. In order to increase the number of the products such as bottle-shaped containers to be molded per unit time in this case, the conventional process employs the steps of engaging the preformed primary piece with predetermined jig to load the preformed piece in the jig, and passing the preformed piece jig assembly through a heater and a biaxially orientation blow molding machine as it is in case of forming a bottle-shaped secondary container or product.

Generally, since there is a molding temperature difference between injection molding and a blow molding, a preformed primary piece injection molded is cooled to predetermined temperature while being supplied to a blow molding machine and is reheated to predetermined temperature prior to a blow molding.

A number of pieces are simultaneously injection-molded, since they are relatively small in size, in an injection molding machine, and are conveyed via a belt conveyor or the like in random, uncontrolled position. However, it is very preferably to convey the pieces thus preformed to a blow molding machine if the pieces are engaged at their projected peripheries at the neck portions thereof to become ports of bottle-shaped containers in upward neck portion attitude.

To this end, the pieces to be conveyed to a blow molding machine should be engaged with orienting jigs disposed upside down due to molding process in neck portion downward position.

SUMMARY OF THE INVENTION

This invention contemplates, accordingly, to overturn pieces of neck portion upward position for the openings to be directed upwardly into neck portion downward position, engage the pieces thus overturned to neck portion downward position with orienting jigs held at equi-distant central angles at the peripheral edge of a turntable rotating at constant speed in predetermined direction, and supply them as held at the jigs around the turntable to a heating unit adjacent to the turntable.

It is a primary object of this invention to provide a device for supplying a piece of synthetic resin which can continuously, rapidly and exactly supply the pieces to the next stage or line.

It is another object of this invention to provide a device for supplying a piece of synthetic resin which can vary simply hold a piece of neck portion upward position at an overturning plate and can then overturn it.

It is still another object of this invention to provide a device for supplying a piece of synthetic resin which can exactly engage the overturned piece from the overturning plate with an orienting jig.

BRIEF DESCRIPTION OF THE DRAWINGS

The above and other related objects and features of the invention will be apparent from a reading of the following description of the disclosure found in the accompanying drawings and the novelty thereof pointed out in the appended claims.

DETAILED DESCRIPTION OF THE PREFERRED EMBODIMENTS

Figure 1:
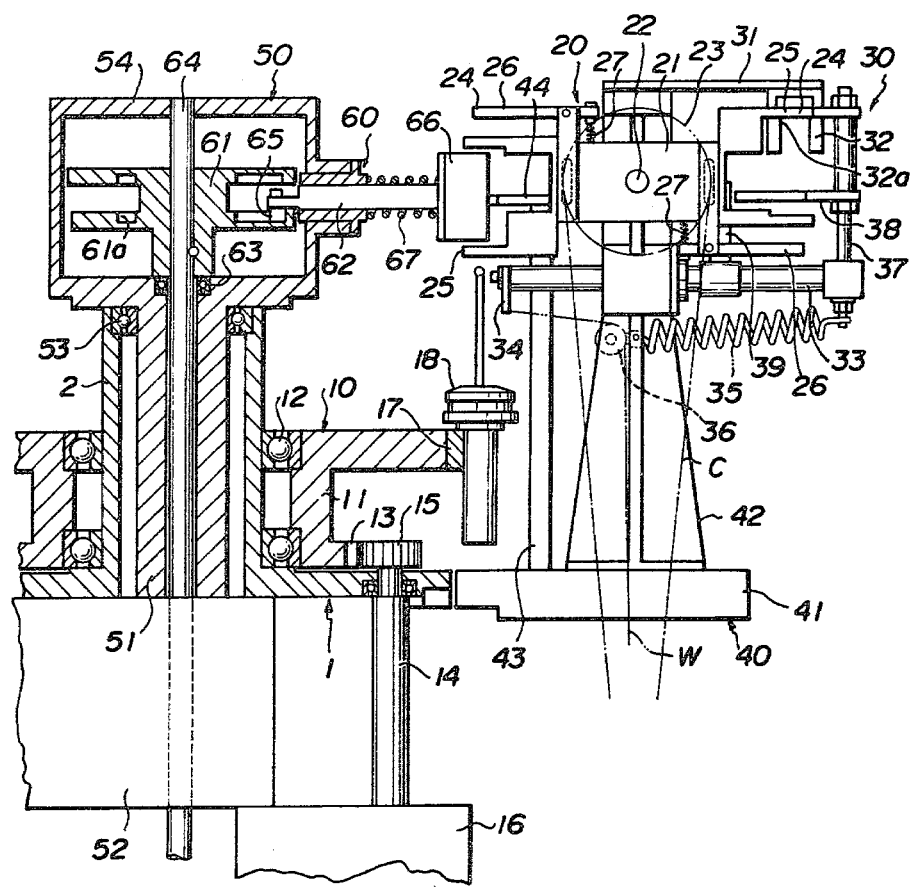
FIG. 1 is a partially fragmentarily side view of one preferred embodiment of the device for supplying a piece according to this invention.

Referring to the drawings, particularly to FIG. 1 showing one preferred embodiment of the device for supplying a piece of synthetic resin constructed according to this invention, wherein like reference numerals designate the same parts in the following views, a cylindrical column 2 stands at the center of a base 1 which is provided adjacent to a unit for heating the piece P (not shown). A turntable 10 is assembled around the column 2.

A cylindrical sheath 11 is formed underneath the turntable 10. The turntable 10 is rotatably assembled via bearings 12 around the column 2 at the sheath 11. Teeth 13 are formed on the outer peripheral surface of the sheath 11 to engage in mesh with a gear 15 mounted at the upper end of a rotary shaft 14 protruded from the base 1. The turntable 10 is horizontally driven through the engagement of the teeth 13 with the gear 15 on the base 1 at predetermined constant speed. The rotary shaft 14 is engaged downwardly with a rotary index 16.

A plurality of strong magnets 17 (12 in number in this embodiment) are arranged at equal central angle intervals at the upper peripheral edge of the turntable 10 to magnetically attract respectively orienting jigs 18.

The jigs 18 are fed to a heating unit in the state for holding the preformed pieces P in neck portion downward position at their neck portions. They are then fed to a blow molding machine where the pieces P are blow-molded to form bottle-shaped containers of secondary products. After the containers are unloaded from the jigs 18, the jigs 18 are then circulated again to the turntable 10.

At the position adjacent to the base 1 is disposed a base 40 which supports a piece overturning unit 20 for overturning the piece P from neck portion upward position to neck portion downward position and positioning the piece P thus overturned at predetermined position, and a piece inserting unit 30 for engaging the pieces P (aligned in neck portion upward position via a chute S) with the overturning unit 20.

The base 40 includes a base plate 41 and supports 42 standing on the base plate 41. The overturning unit 20 includes a piece overturning plate 21 rotatably secured via a rotary shaft 22 substantially extending along the radial direction of the turntable 10 over the predetermined height of the supports 42.

The overturning plate 21 is formed substantially in rectangular shape and incorporates a rotary shaft 22 passing through the center thereof. The overturning plate 21 is rotatably driven by the rotating force transmitted to a gear pulley 23 mounted at the same shaft as the rotary shaft 22. The force is applied in predetermined vertical direction (counterclockwise in FIG. 1) in an intermittent manner for stopping at the horizontal position for a predetermined time when the plate 21 is positioned horizontally at predetermined timing imparted to the gear pulley 23. This gear pulley 23 is, for that purpose, connected to an intermittent index (not shown) located under the base 40 via a chain belt C to transmit predetermined intermittent rotation to the overturning plate 21.

Figure 2:
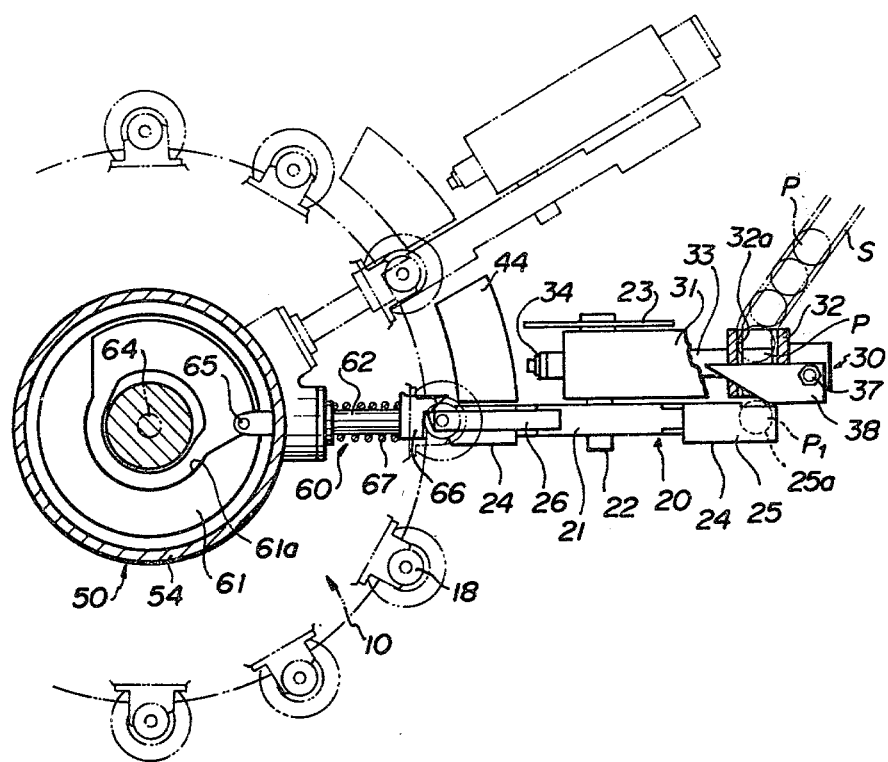
FIG. 2 is a plan view of the device shown in FIG. 1.
Figure 3:
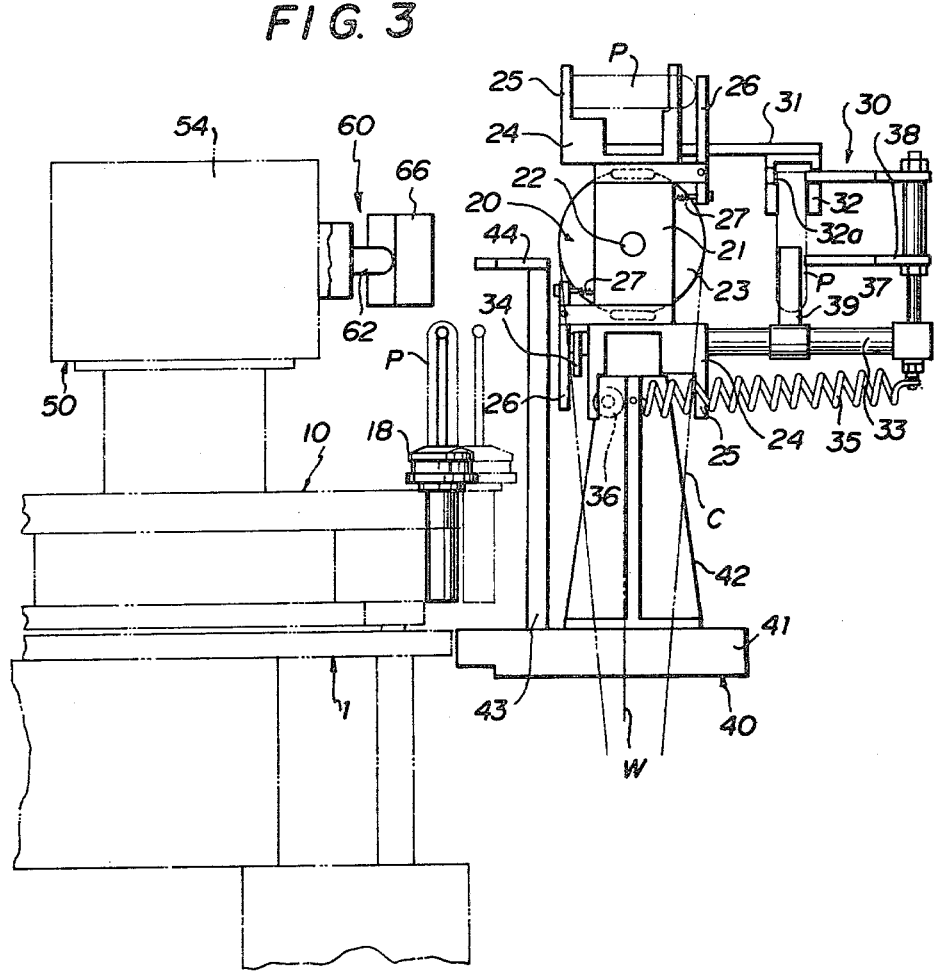
FIG. 3 is a schematic side view of the overturning plate used for the device of this invention.

There are formed holders 24 at the overturning plate 21 which are symmetrical with respect to the rotary shaft 22 as an origin. In FIGS. 1 and 2, showing the stopped state of the overturning plate 21, there will be described the case where the holders 24 are disposed at the position opposite to the turntable 10. The U-shaped holder 24 includes an upper supporting plate 25 and a lower retaining plate 26. The neck portion of the piece P is supported by the plate 25 and supporting the bottom of the piece P by the retaining plate 26. A semi-circular recess 25a of substantially the same diameter as the neck portion of the piece P is formed on the lower surface of the supporting plate 25 to receive and deliver the piece P as will be described in greater detail. Inasmuch as the retaining plate 26 is journaled with the overturning plate 21 in the vicinity of the base end thereof connected via a spring 27 to the overturning plate 21, it always tends to approach at the other end toward the supporting plate 25 within a predetermined limit.

When the piece P of neck portion upward position is inserted horizontally toward the opening direction of the recess 25a of the supporting plate 25 between the upper supporting plate 25 and the lower retaining plate 26, it is engaged with the supporting plate 25 via the recess 25a at the neck portion without displaced position and is urged at the bottom thereof by the end of the retaining plate 26 via the spring 27 toward the supporting plate 25 to thus exactly be held therebetween at the holder 24.

The overturning plate 21 is, on the other hand, so supported at the supports 42 of the base 40 that, when the overturning plate 21 is stopped horizontally, the holder 24 in the vicinity of the turntable 10 is located on the rotating path of the orienting jig 18 of the turntable 10.

The piece P is inserted in the state of neck portion upward position into the holder 24 located oppositely to the turntable 10 when the overturning plate 21 is stopped horizontally by the piece inserting unit 30, which will now be described in detail.

At the tops of the supports 42 on the base 40 there is provided a bracket 31 in parallel with the overturning plate 21 to project radially outwardly to the turntable 10. At the end of the bracket 31 are hung piece suspensions 32 disposed at the position corresponding to the holder 24 when the overturning plate 21 is stopped horizontally. Further, to the piece suspensions 32 of opposite side to the overturning plate 21 is connected a chute S for holding to supply the pieces P group of neck portion upward position fed upon injection molding.

The piece suspensions 32 include a pair of plates crossing at the extended axial line perpendicularly at the overturning plate 21, which plates are formed with horizontally grooves 32a on the inner surfaces thereof for engaging the periphery of the neck portion of the piece P therebetween to thus hold the piece P between the suspensions 32 in neck portion upward position.

At the center of the supports 42 on the base 40 is slidably provided a shaft 33 which moves longitudinally in radial direction of the turntable 10 therethrough directly under the bracket 31. Shaft 33 is connected to a wire W via a bracket 34 at one end of the turntable 10 and to one end of a coil spring 35 at the other end thereof.

This wire W is extended under tension downwardly via a pulley 36 mounted at the supports 42. The coil spring 35 is connected at the other end to the supports 42. Thus, the shaft 33 is always urged slidably toward the turntable 10 by means of the coil spring 35. The wire W is, when pulled downwardly by certain means, urged in the direction opposite to the turntable 10 through the pulley 36 to the shaft 33, which is thus balanced in response to the strength of the tensions of the coil spring 35 and the wire W.

A supporting shaft 37 stands at the opposite end to the turntable 10 of the shaft 33. Furthermore, a pair of planar guide plates 38 are elevationally protruded toward the turntable 10 from the supporting shaft 37. The guide plate 38 is cut in a right-angled triangle shape sharpened at the end as seen from the top at the side of the overturning plate 21 of the guide plate 38.

In the case where the wire W is loosened at its tension when the overturning plate 21 of the overturning unit 30 is stopped horizontally, the shaft 33 is slid toward the turntable 10 by the tension of the coil spring 35, whereupon the guide plate 38 is also moved toward the turntable 10. However, the piece suspensions 32 for hanging the piece P are disposed forwarding of the guide plate 38. The sharpened ends of the guide plates 38 are protruded between the leading piece $P_1$ and the next piece $P_2$ of the pieces P continuously aligned from the chute S. When the guide plates 38 are moved forwardly, the leading piece $P_1$ is pushed forwards toward the holder 24 of the overturning plate 21 via the surface facing opposite to the overturning plate 21 at the end of the guide plates 38 thus cut.

Since the recess 25a of the supporting plate 25 in the holder 24 of the overturning plate 21 is opened toward the piece suspensions 32, the piece $P_1$ can simply be moved into the recess 25a at the neck portion thereof and can also be urged down at the bottom thereof against the urging strength of the spring 27 at the retaining plate 26 to be thus inserted into the holder 24. Since the recess 25a is formed in semi-circular shape along the neck portion of the piece P, the piece P is not pushed toward the opposite side of the piece suspensions 32 of the holder 24 to drop. This problem is also prevented in advance by the urging force of the retaining plate 26 toward the supporting plate 25.

A stopper 39 installed at the shaft 33 is placed in the vicinity of the end of the guide plates 38 for tensioning the wire W against the tension of the coil spring 35 after the leading piece $P_1$ is inserted into the holder 24 of the overturning plate 21. Thus the shaft 33 slides in opposite direction to the turntable 10 to retard the guide plates 38, whereupon the piece $P_2$ may stand by at the same position.

The piece inserting unit 30 is thus constructed according to the present invention. In order to engage the piece P held by the overturning plate 21 of the overturning unit 20 with the orienting jig 18 of the turntable 10 in downwardly neck portion attitude, the piece P is moved by a rocking unit or oscillating drive mechanism 50 and a device 60 for unloading the piece P concentrically assembled with the turntable 10.

The rocking unit 50 is assembled concentrically with the turntable 10 as to ride on the column 2 of the base 1 described previously and incorporates a cylindrical output shaft 51 connected to a rockable index 52 mounted underneath the base through the column 2.

The output shaft 51 of the rocking unit is rotatably engaged via bearings 53 with the column 2. The rocking unit 50 is operated as predetermined by the rockable index 52. More particularly, the rocking unit 50 reciprocatingly turns, when at predetermined timing, at the same speed in the same direction as the turntable 10 (at 30° in this embodiment). The rocking unit will then turn back to the original position at a speed faster than the speed of the turntable 10.

The top of the rocking unit 50 for rocking is formed with a housing 54, in which a device 60 for unloading the piece is contained to protrude partially from the side wall of the housing 54.

The device 60 mainly consists of a disk cam 61 and an arm 62. The disk cam 61 disposed within the housing 54 is horizontally supported at the top of the rotary shaft 64 passing rotatably through the output shaft 51 via bearings 63 in the rocking unit 50. The disk cam 61 is separately rotated in predetermined direction at constant speed with respect of the rocking motion of the rocking unit 50 and the rotation of the turntable 10 by the index (not shown) located under the rotary shaft 64. The disk cam 61 accommodates cam groove 61a of predetermined shape formed thereat.

Figure 4:
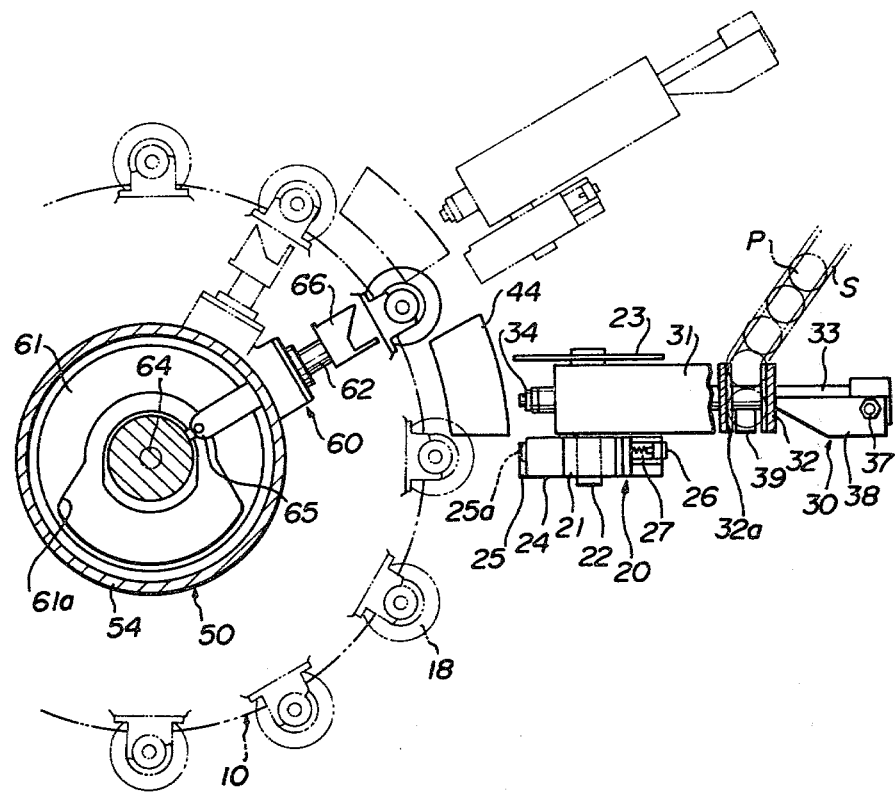
FIG. 4 is a plan view of the overturning plate used for the device shown in FIG. 3.

In FIG. 1, a pair of disk cams 61 are elevationally provided for the case that two sets of arms 62 are installed as will be described later in greater detail. The cams 61 will be described according to the motion of the lower cam 61. FIGS. 2 and 4 also show the lower disk cam 61 and cam groove 61a.

The arms 62 are slidably assembled radially of the turntable 10 through the side wall of the housing 54 of the rocking unit 50. At the base end disposed within the housing 54 of the cam 62 is mounted a cam follower 65 engaged with the cam groove 61a of the disk cam 61. At the end of the arms 62 is mounted a forked hook 66. A spring 67 is engaged between the hook 66 of the arm 62 and the side wall of the housing 54 to allow the arms 60 to be always urged forwardly by the tension of the spring 67.

The cam follower 65 makes surface contact with the cam surface of the cam groove 61a.

The arms 62 are, when the disk cam 61 is rotated upon rotation of the rotary shaft 64 in predetermined direction, slid reciprocatingly in radial direction of the turntable 10 according to the shape of the cam groove 61a.

The arms 62 are so set in length that the hook 66 is located on the rotating path of the orienting jig 18 of the turntable 10 at the outward limit via the cam mechanism.

The piece P is engaged with the jig 18 held at the peripheral end of the turntable 10 thus by means of the rocking unit 50 and the device 60 for unloading the piece P in operation at timing as will be described below.

When the overturning plate 21 of the overturning unit 20 is stopped horizontally, the holder 24 of the overturning plate 21 at the turntable 10 side holds the piece P in neck portion downward position to be disposed on the rotating path of the jig 18 at the peripheral end of the turntable 10. The rocking unit 50 is ready to start moving forward at this time. The arms 62 are moved to the vicinity of the forward limit. When the arms 62 are forwarded to the forward limit to the position for holding the piece P of the holder 24 of neck portion downward position by the hook 66, the rocking unit 50 starts moving forward and the arms 62 also rock in the same direction at the same speed at the turntable 10 in the state for engaging the piece P at the hook 66.

When the jig 18 is rotated directly under the hook 66 at the end of the arms 62, the piece P held simply between the plates of the holder 24 is laterally engaged by the hook 66 by the rocking motion of the arms 62. Since the jig 18 is located directly under the hook 66 while rotating, the piece P thus laterally engaged by the holder 24 is snugly engaged with the jig 18 as it is. In order to accurately engage the piece P with the jig 18 at this time without dropping, a post 43 is provided on the base plate 41 of the base 40 to support a guide plate 44 along the rotating path of the jig 18 outside the turntable 10.

When the arms 62 are extended forward, the guide plates 38 are also moved forward at the inserting unit 30 to insert the piece P into the holder 24 of the overturning plate.

When the plate 21 is thus stopped horizontally, the piece P is inserted into the holder 24 at one end of the plate 21 by the inserting unit 30 and the piece P is unloaded at the other end of the plate 21 from the holder 24 by the device 60 for unloading the piece P.

When the pieces P are thus inserted and unloaded into and from the holders 24, the guide plates 38 at the inserting unit 30 are immediately retracted by the loosened wire W, while the arms 62 are moved forward while engaging the piece P. The overturning plate 21 starts rotating in predetermined direction (counterclockwise in FIGS. 1 and 2) immediately thereafter.

The arms 62 moving forward upon movement of the rocking unit 50 forwardly are guided via the cam groove 61a of the disk cam 61 to be retracted in the vicinity of the forwarding limit for completing the engagement of the piece P with the jig 18 as shown in FIGS. 2 and 4, and again starts forward in the vicinity of the original position to unload the piece P which is newly fed by the rotation of the overturning plate 21 while the arms are moving backward to the original position.

The arms 62 are thus moved back and forth so as not to collide with the overturning plate 21 while returning to the original position.

The disk 61 is thus rotated once by one rocking operation of the rocking unit 50. The cam groove 61a is so formed as to reciprocate the arms 62 as described above.

Since two sets of overturning unit inserting units and unloading units are thus assembled as designated by imaginary lines in the drawings in this embodiment, two piece P are simultaneously engaged with the jigs 18 by one rocking operation of the rocking unit 50. Inasmuch as the jigs 18 (preferably 12 in number) are arranged at equidistant central angles at the turntable 10, the rotating cycle of the disk cam 61 is six times the rotating speed of the turntable 10. The overturning plate 21 is naturally rotated by half by one rocking operation of the rocking unit 50.

Since the device of this invention is thus constructed and operated, it is understood from the foregoing description that it can hold the piece of neck portion upward position within the holder by the inserting unit and can also overturn the piece. It can also exactly remove the piece from the overturning plate and engage it with the jig by means of the reciprocating motion of the arms in the unloading device and the rocking motion of the rocking unit.

According to the device for supplying the piece constructed in accordance with this invention, it can continuously, rapidly and exactly supply the pieces of synthetic resin preformed to predetermined processing line effectively in the case of biaxially orientation blow molding the piece into a bottle-shaped container.

What is claimed is:

1. A device for supplying an injection molded cylindrical piece having a bottom and a neck in neck portion downward position to one of a plurality of orienting jigs comprising:

a turntable turning at constant speed in a predetermined direction;

a plurality of orienting jigs held at equidistant central angles at the peripheral edge of said turntable;

a base plate provided at the side of said turntable;

a support provided on said base plate;

a vertically disposed rectangular overturning plate rotatably secured to the upper portion of said support radially outwardly of said turntable and stoppable at a horizontal position;

overturning means for intermittently rotating said overturning plate 180°;

holders provided at both ends of said overturning plate, said holders being formed substantially by a U shaped upper supporting plate and a lower retaining plate, the distance between said upper and lower plates being approximately that from the neck to the bottom of the piece;

a bracket provided at the upper end of said support and projecting in parallel with said overturning plate and away from said turntable;

a piece supension provided at the end of said bracket and arranged at a position corresponding to said holders, disposed at the bracket end furthest from said turntable when said overturning plate is stopped in horizontal state;

a chute connected to said piece suspension and holding the pieces in neck portion upward position to supply them to the device;

a shaft longitudinally slidable in the radial direction of said turntable, provided substantially directly under said bracket between the ends of said support;

a wire mounted at its one end to the turntable side shaft end and imparted at its other end with a predetermined tension force;

a coil spring mounted at its one end at the shaft end opposite to the turntable and at its other end to said support;

a supporting shaft extending from the end of the shaft mounted with said coil spring;

a guide plate extending toward said turntable from said supporting shaft, said guide plate entering between the first piece and the second piece retained at said piece suspension to urge the first piece into said holder;

rocking means disposed coaxially with said turntable and rocking at the same speed in the same direction as said turntable for a predetermined angle and subsequently returning at least the same speed as said turntable speed to the original position;

a radially reciprocating arm assembled with said rocking means;

arm reciprocating means connected to said arm for positioning said arm at a radially outward limit when said rocking means starts rocking in the direction of said turntable movement and radially reciprocating said arm when said rocking means is near the end of its movement in the direction of said turntable movement;

a hook mounted at the end of said arm for engaging the piece held in neck portion downward position by said overturning plate and dropping it to engage it with the orienting jig disposed directly thereunder.

2. The device according to claim 1, wherein said turntable has a cylinder at its center and is rotatably assembled through bearings on the outer periphery of a cylindrical post positioned on a base.

3. The device according to claim 1, wherein said orienting jig is magnetically secured by a magnet arranged at the peripheral edge of said turntable.

4. The device according to claim 1, wherein said supporting plate is provided with a recess for engaging the neck portion of the piece.

5. The device according to claim 1, wherein said overturning plate is pivotally secured to said support so that when said overturning plate is stopped in a horizontal state, the holder in the vicinity of said turntable is positioned on the rotating path of the orienting jig.

6. The device according to claim 1, wherein said piece suspension is formed with a groove for holding the piece in neck portion upward position by engaging a projection on the peripheral surface of the neck portion of the piece in horizontal direction of the inner surface thereof.

7. The device according to claim 1, wherein a guide plate is horizontally provided at both upper and lower positions of the supporting shaft, each plate being provided with a portion tapered to a point, said point being disposed near said overturning plate.

8. The device according to claim 1, wherein said turntable comprises a turntable base and a hollow column extending from the center of said base and said rocking means has a cylindrical output shaft and a housing provided at the upper portion of the output shaft, the output shaft being connected to a rockable index mounted underneath the turntable base through the column of said turntable, the output shaft and the column being mutually rotatable through bearings.

9. The device according to claim 8, wherein said output shaft is hollow and a disk cam is arranged in the housing, and is secured to a rotary shaft passing relatively rotatably through the output shaft by means of bearings, and is rotated in predetermined direction at constant speed separately from the relation with the rocking motion of said rocking means and the rotation of said turntable.

10. The device according to claim 9, wherein said arm is mounted at one end of said cam disk and at the second end is projected outwardly through the side wall of the housing, wherein said hook is formed with a forked shape and is mounted at the second end.

* * * * *